United States Patent [19]
Skinner et al.

[11] Patent Number: 5,158,400
[45] Date of Patent: Oct. 27, 1992

[54] ROTARY DISC CUTTER AND METHOD OF MAKING SAME

[75] Inventors: Paul R. J. Skinner; Robert J. Ball, both of Plymouth, England

[73] Assignee: The Gleason Works, Rochester, N.Y.

[21] Appl. No.: 683,403

[22] Filed: Apr. 10, 1991

[51] Int. Cl.[5] .............................. B23F 21/24
[52] U.S. Cl. .................................. 407/12; 76/115; 407/29
[58] Field of Search .................. 407/12, 13, 19, 20, 407/29, 14–18; 76/115

[56] References Cited
U.S. PATENT DOCUMENTS

| | | |
|---|---|---|
| 1,492,505 | 4/1924 | Bonnaffous et al. |
| 2,267,181 | 12/1941 | Wildhaber . |
| 2,278,576 | 4/1942 | Wildhaber ........................... 51/288 |
| 2,315,147 | 3/1943 | Wildhaber . |
| 2,327,296 | 8/1943 | Wildhaber . |
| 2,392,278 | 1/1946 | Wildhaber ........................... 407/29 |
| 2,662,427 | 12/1953 | Smal ................................... 76/112 |
| 3,924,318 | 12/1975 | Baker . |

FOREIGN PATENT DOCUMENTS

| | | |
|---|---|---|
| 3618290 | 12/1987 | Fed. Rep. of Germany . |
| 201893 | 11/1967 | U.S.S.R. ............................. 407/12 |
| 649538 | 1/1951 | United Kingdom . |

*Primary Examiner*—Steven C. Bishop
*Attorney, Agent, or Firm*—Robert L. McDowell; Ralph E. Harper

[57] ABSTRACT

A rotary disc cutter for cutting workpieces, especially gears and the like. The rotary cutter comprises a plurality of cutting blades arranged about the periphery of a rotary disc cutting body with at least a portion of the blades being roughing blades comprising a tip and two sides with each side having first and second side portions. The first side portion along with the tip defining a cutting surface of the blades while the second side portion is relieved such that a clearance is formed between the second side portion and the surface of the workpiece. The clearance being of a dimension to allow the flow of coolant therethrough thereby improving the cooling of the cutting surface and enhancing the flow of chips away form the vicinity of the blades. The invention further includes a substantially reduced number of blade segments. Alternative blade tip configurations are also disclosed.

35 Claims, 11 Drawing Sheets

ROTARY DISC CUTTER AND METHOD OF MAKING SAME

FIELD OF THE INVENTION

The present invention is directed to rotary disc cutters, particularly rotary disc cutters utilized in the production of gears, and to a method of producing rotary disc cutters.

BACKGROUND OF THE INVENTION

Rotary disc cutters are devices for cutting workpieces, such as gears, very rapidly. The cutters are usually designed whereby a single revolution of the rotary disc cutter produces one tooth space on a gear blank. When the rotary cutter has made as many revolutions as the gear blank has tooth spaces, the gear is completed.

The basic form of a rotary disc cutter is shown, for example, in U.S. Pat. No. 2,315,147 to Wildhaber. The cutter comprises a relatively large diameter cutter with a plurality of blades located about the periphery thereof. A gap is present between the last and first blades in order to permit indexing of the gear blank when the gap is abreast of the blank.

In general, both roughing and finishing blades are present on a rotary cutter. U.S. Pat. No. 2,327,296 to Wildhaber shows roughing blades being of gradually increasing height, up to the desired depth of a tooth slot, to enable each successive blade to cut deeper into the gear blank as the cutter revolves. During rough cutting the rotary cutter and the gear blank are usually held in a fixed position, although for gears of increased width, it may be necessary for the rotary cutter to translate relative to the gear in order to remove sufficient stock along the tooth length. Roughing blades are somewhat narrower than finishing blades in order to leave a slight amount of stock on the tooth surfaces for removal by the finishing blades. Since both the rotary cutter and gear are usually held stationary during rough cutting, roughing blades produce a generally complimentary-shaped surface profile on the gear. For example, a concave circular arcuate profiled roughing blade would produce a convex circular arcuate profile on a tooth surface.

Following roughing, the finishing blades form the final surface of the tooth. The finishing blades are usually of uniform height and, during finish cutting, the rotary cutter and the gear blank are translated relative to one another along the length of the gear tooth thus enabling the finishing blades to produce a finished surface across the entire length of the tooth surface.

Many variations of rotary disc cutters are known in the art. For example, rotary disc cutters comprising only roughing blades are known. It follows then that an accompanying rotary cutter comprising finishing blades is necessary to produce a finished gear. The sides of a tooth slot may be finished by a single rotary cutter comprising two blade groups, as disclosed in U.S. Pat. No. 2,315,147, for sequentially finishing the sides of a tooth slot. After the first group finishes a first side surface, the gear is "set-over", that is, rotated a defined amount, and the second side surface is finished by the second group of blades on the rotary cutter. A gap between the two blade groups permits the set-over or position change of the gear.

The side surfaces on both the roughing and finishing blades are generally of circular arcuate profile although other profile shapes, such as involute, are also known.

Both roughing and finishing blades comprise an end or tip and two side surfaces. Usually in roughing blades, the profiles of the side surfaces are all circular arcs based on the same center of curvature with only the length of the blades increasing in the direction of cutter rotation. Finishing blades may also have a curvature based on the same center. Such finishing blades may be utilized in the production of spur and helical gears as discussed in the previously mentioned U.S. Pat. No. 2,327,296 to Wildhaber.

However, it is also known to modify the profiles of successive blades of rotary cutters. For example, U.S. Pat. No. 2,315,147 discloses that, for bevel gears, successive finishing blades may vary in profile shape each according to the position at which it is to cut along the length of the tooth as relative translational movement between the cutter and gear takes place during the finishing operation. The successive finishing blades comprise a varying radii of curvature to provide variation in profile curvature from end to end of the gear tooth. The varying profile shape approach may also be applied to the roughing blades.

Profiles of finishing blades may have the same radius of curvature but the centers of curvature may be spaced either uniformly or nonuniformly along a line parallel to the tangent of the tooth profile according to U.S. Pat. No. 2,267,181 to Wildhaber. This approach enables a single rotary cutter to produce gears having different variations in profile curvature along the length of the teeth. Varying the feed rate of the rotary cutter relative to the gear controls the profile curvature. This concept may also be applied to the roughing blades thus requiring relative translational movement between the rotary cutter and gear during the roughing operation.

Roughing blades having slightly relieved circular arcuate side surfaces are known from U.S. Pat. No. 2,327,296. Each side comprises a singular circular arc profile and the purpose of the relieved side surface is to prevent side surfaces of the blades from contacting the tooth profiles formed by the preceding roughing blades thus avoiding rubbing of the blades on the tooth slot being cut. Only the juncture of the sides with the tip and the tip itself actually remove stock material from the gear.

In view of the speed at which rotary disc cutters remove stock material from gear blanks, wear, due to increased heat at the cutting surfaces, is a major concern. Metal chips packing between successive blades may also occur if the shape of the removed chip is not correct or if not enough fluid is present to wash the chips away from between the blades. Metal chips that collect between successive cutting blades may become hot due to the heat generated by the rapid cutting speed and the heat, in turn, may cause the chips to bond to one another and to the cutting blades.

It is an object of the present invention to reduce or eliminate the above-mentioned problems without sacrificing the speed of the cutting process.

It is another object of the present invention to provide a cutting blade that permits improved cooling of the cutting surface thereof and enhances the removal of metal chips from the vicinity of the blades.

A further object of the present invention is to reduce the costs involved with cutter production while extending the useful life of a rotary disc cutter due to less wear and chip packing during the cutting process.

SUMMARY OF THE INVENTION

In the present invention, a relief surface is included on part of the side surface of at least a portion of the plurality of blades, preferably the roughing blades, arranged about the periphery of a rotary disc cutter. The relief surface allows a clearance to be formed between the relief surface and the surface of a workpiece. The clearance is of a dimension to allow the flow of coolant therethrough, thereby improving the cooling of the cutting surfaces of the blades, and provide for increased amounts of coolant to wash metal chips away from the cutting blades.

A rotary disc cutter comprises a plurality of blades arranged about the periphery thereof. Each blade comprises a tip and two sides. In at least a portion of the plurality of blades, the sides of each blade comprise first and second side portions with the first side portion having an outermost edge coextensive along the thickness of the blades with the tip of the blade. The first side portion and the tip comprise the "cutting surface" of the blade. The second side portion is, in turn, coextensive along the thickness of the blade with an innermost edge of the first side portion. The second side portion is relieved from the first side portion. The first and second side portions define a piecewise surface and the profile of the piecewise surface is one of intersecting segments such as two curves. Either or both of the first and second side portions may be circular arc surfaces thus having circular arc profiles.

DETAILED DESCRIPTION OF THE PREFERRED EMBODIMENTS

The details of the present invention will now be discussed with reference to the accompanying Drawings which represent the invention by way of example only.

Figure 1:
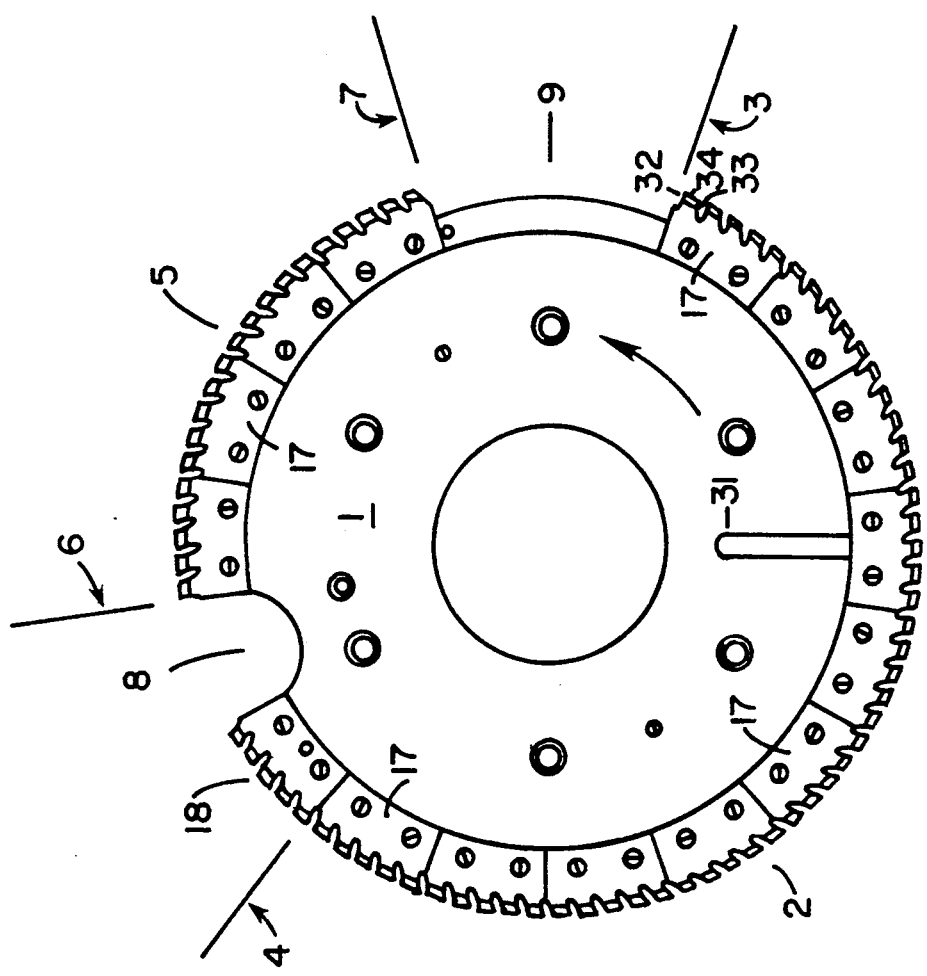
FIG. 1 schematically illustrates the general form of a rotary disc cutter.

The general form of a rotary disc cutter is shown in FIG. 1. The cutter comprises a circular body portion 1 with a plurality of individual cutting blades arranged on segments 17 and spaced from one another about the periphery of the body portion 1. Each blade included in each segment comprises a front surface or "face" 32 and a back surface 33, two sides and a tip or end 34. Each blade is inclined forward. A cutting edge is formed at the intersection of the sides and tip with the front surface 32. In FIG. 1 the rotary cutter comprises a series of roughing blades 2, formed on separate segments 17, extending in a clockwise direction from 3 to 4, a single segment of semi-finishing blades 18 and separate segments 17 of finishing blades 5, extending from 6 to 7. Each successive roughing blade of the series is longer than the previous blade to enable each successive blade to cut deeper into a workpiece to the desired depth of cut. The gap 8 located between the last semi-finishing blade at 18 and the first finishing blade at 6 is the location for attaching a deburring tool (not shown) for removing burrs from the end of a tooth slot subsequent to roughing and semi-finishing. Roughing, semi-finishing and finishing blades are formed integral with the plurality of segments 17 and the segments are secured about the periphery of the body portion 1. It can be seen in FIG. 1 that there are about five cutting blades located integral with each of the segments 17. The gap 9 is an indexing gap which allows the work gear to be rotated to the next tooth slot position when the gap 9 is abreast the gear blank. A keyway 31 is located in the body of the cutter to facilitate placement of the rotary cutter on a cutting machine.

In operation, the roughing blades 2 engage a gear blank and due to their successively increasing height, cut successively deeper into the blank to the desired depth of cut. At this point blades from 3 to 4 have engaged the work gear. Typically, as stated in the "Background of the Invention" above, roughing blades are designed with circular arc side surfaces with all side surfaces having the same center of curvature. During roughing there is usually no relative motion between cutter and work gear. Therefore, the surface formed on the tooth surface is complementary to the surface on the roughing blades. Since roughing blades surfaces are normally concave circular arcs the complementary surface on the tooth would therefore be a convex circular arc. Roughing blades are narrower than finishing blades in order to leave sufficient metal on the tooth surfaces to be removed by the finishing blades.

Generally following the last roughing blade at 4 there is a segment of semi-finishing blades 18. These blades are the same width as the roughing blades and their purpose is to form a surface similar to the finished surface thus reducing the amount of stock material remaining on the tooth surface for removal by the finishing blades. As these blades engage the work gear the rotary cutter is translated relative to the work gear through the tooth slot thus producing a surface similar to the desired finished surface. Semi-finishing blades are generally all of the same height. The side surface profiles of the semi-finishing blades are usually comprised of the same circular arc but with the center of the arc being at different positions, for example along a straight line, for each successive blade.

After deburring by a tool (not shown) located at 8 the first finishing blade at 6 engages the work gear and as the finishing blades rotate through the tooth slot the rotary cutter is translated relative to the tooth slot in the reverse direction of the semi-finishing motion. Thus it can be seen that after final finishing blade at 7 passes from the tooth slot, the rotary cutter will be back at the position for roughing. At this point the indexing gap 9 is abreast the work gear thus allowing the work gear to be indexed to the next slot position. As stated above, finishing blades are wider than the roughing and semi-finishing blades and are typically all of the same height with side surface curvature varying depending upon the type of surface desired. Examples of different side surfaces were discussed in the "Background of the Invention".

Figure 2:
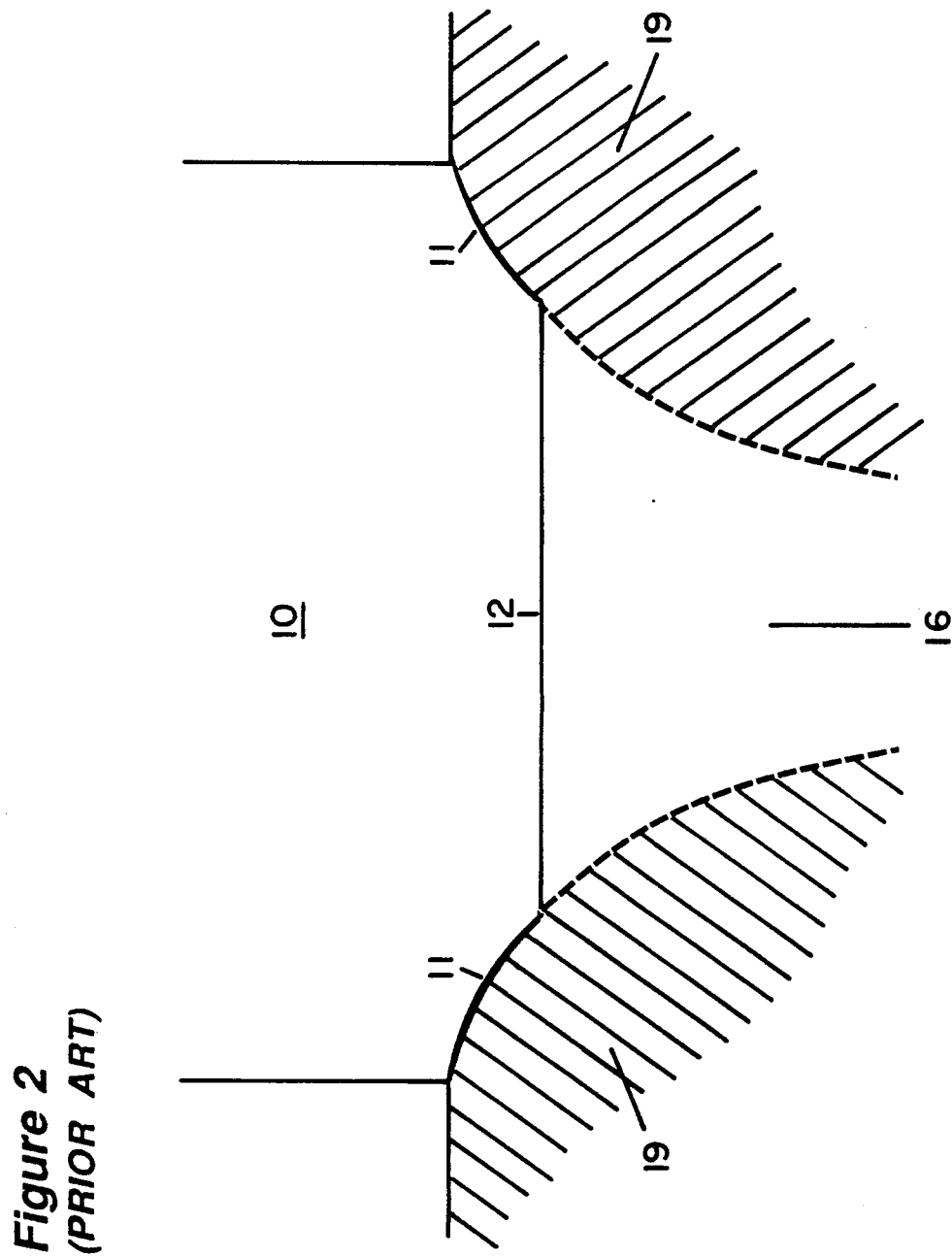
FIG. 2 illustrates a conventional roughing blade for forming a portion of a tooth slot.

It is the roughing blades which are the primary focus of the present invention. FIG. 2, enlarged to show detail, illustrates a conventional roughing blade 10 in position for cutting a portion of tooth slot 16 between adjacent teeth 19 on a work gear. The blade 10 comprises an end or tip 12 and sides 11.

Figure 3:
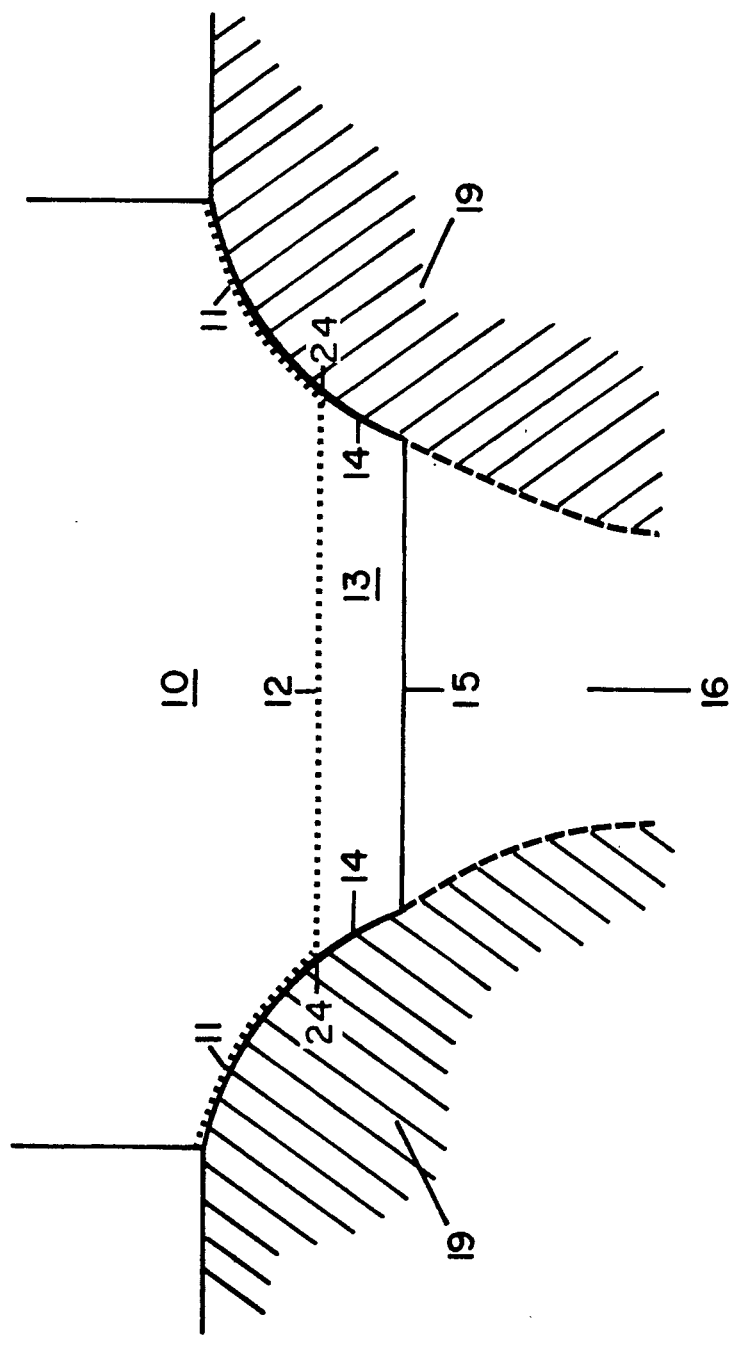
FIG. 3 illustrates two successive roughing blades for forming a portion of a tooth slot.

FIG. 3 illustrates an enlarged view of two successive conventional roughing blades: the previously discussed blade 10, represented by dashed lines, and blade 13 for cutting a portion of a tooth slot 16 between adjacent teeth 19 on a work gear. It is to be understood that blades 10 and 13 do not pass a particular location in the tooth slot 16 simultaneously. Blades 10 and 13 pass through the tooth slot successively as do all blades of a rotary disc cutter. FIG. 3, as well as any other Figures illustrating a plurality of blades at a particular cross-sectional location of a tooth slot, is intended to show the position of each illustrated blade as it passes a particular location in a tooth slot. These Figures are for comparative purposes of the cutting positions of the illustrated blades and are in no way intended to suggest simultaneous cutting by a plurality of blades at a particular cross-sectional location of a tooth slot.

In FIG. 3 it can be seen that blade 13 comprises sides 14 and tip 15. It can also be seen that although the sides 14 of blade 13 extend from the tip 15 to the top of the teeth 19, only the portion of the sides 14 that extends from the tip 15 to the location 24, which is the location to where previous blade surfaces 11 and 12 have cut, actually remove material from the tooth slot 16. The portion of the sides 14 which extend from location 24 to the top of teeth 19 merely pass over tooth surfaces that have already been cut by previous blade 10 and any number of blades preceding blade 10. Therefore these portions of the blade sides do no actual cutting as there is no stock to be removed from that portion of the tooth surface. It can therefore be seen that, when considering all roughing blades, only the tip and that portion of the sides which extends beyond the length of the preceding blade, actually remove stock material from the slot of a work gear, with the exception, of course, of the first roughing blade which has no preceding roughing blade.

Figure 4:
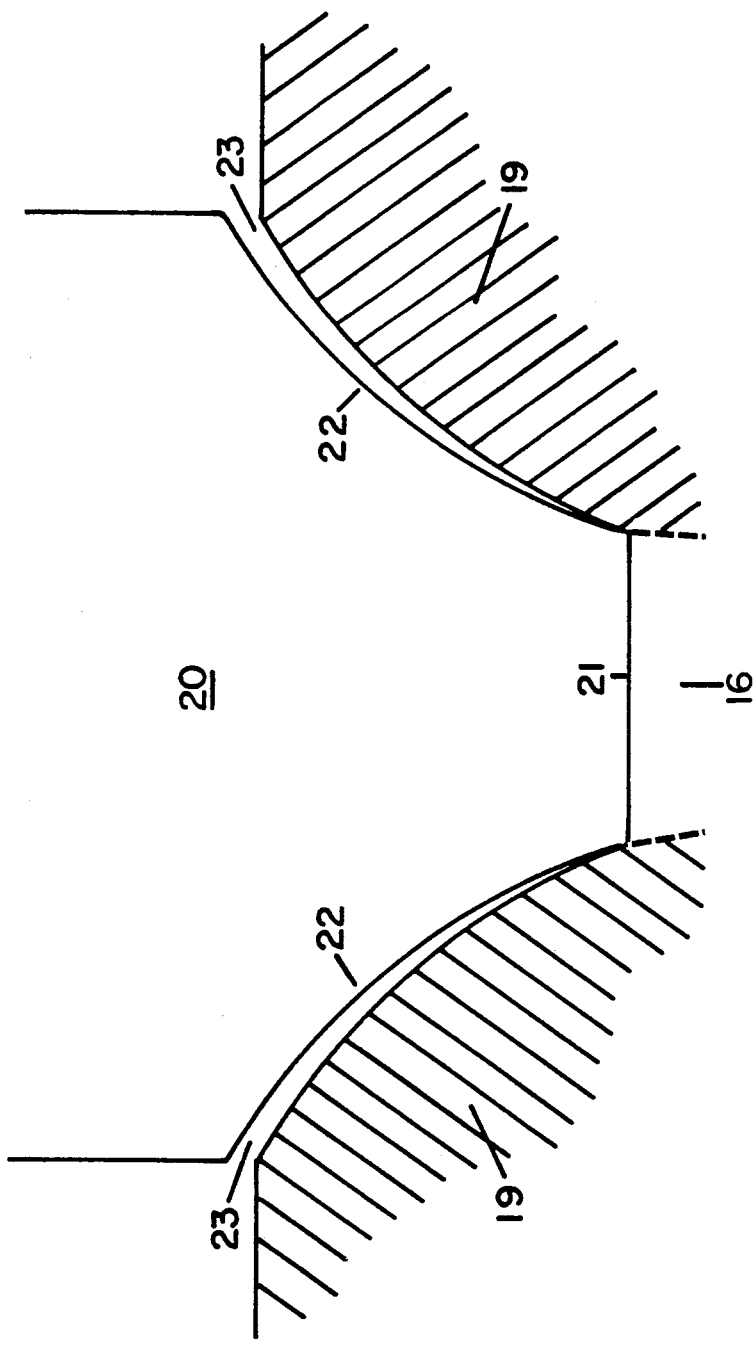
FIG. 4 shows another roughing blade in accordance with the prior art.

Side surfaces of roughing blades rubbing already cut tooth surfaces was addressed in previously discussed U.S. Pat. No. 2,237,296. FIG. 4 illustrates an enlarged view of the disclosed blade form of that patent wherein a blade 20 is shown having a tip 21 and sides 22. The sides 22 of the blade 20 are slightly relieved from being complementary with tooth surfaces 19. The amount of relief is shown at 23. The relief thus prevents rubbing of the blade side surfaces 22 on the side surfaces of the teeth 19. In this embodiment, however, it can be seen that only the tip would be cutting the desired width of the tooth slot 16. The side 22 of this particular arrangement would do little cutting along the desired surface of the tooth. It is also evident that as successive blades engage tooth slot 16, stepwise portions of stock material will be left on the tooth sides. The stepwise portions representing material remaining between successive blades due to the relief surfaces. The stepwise portions of stock material will be discussed further below.

Figure 5:
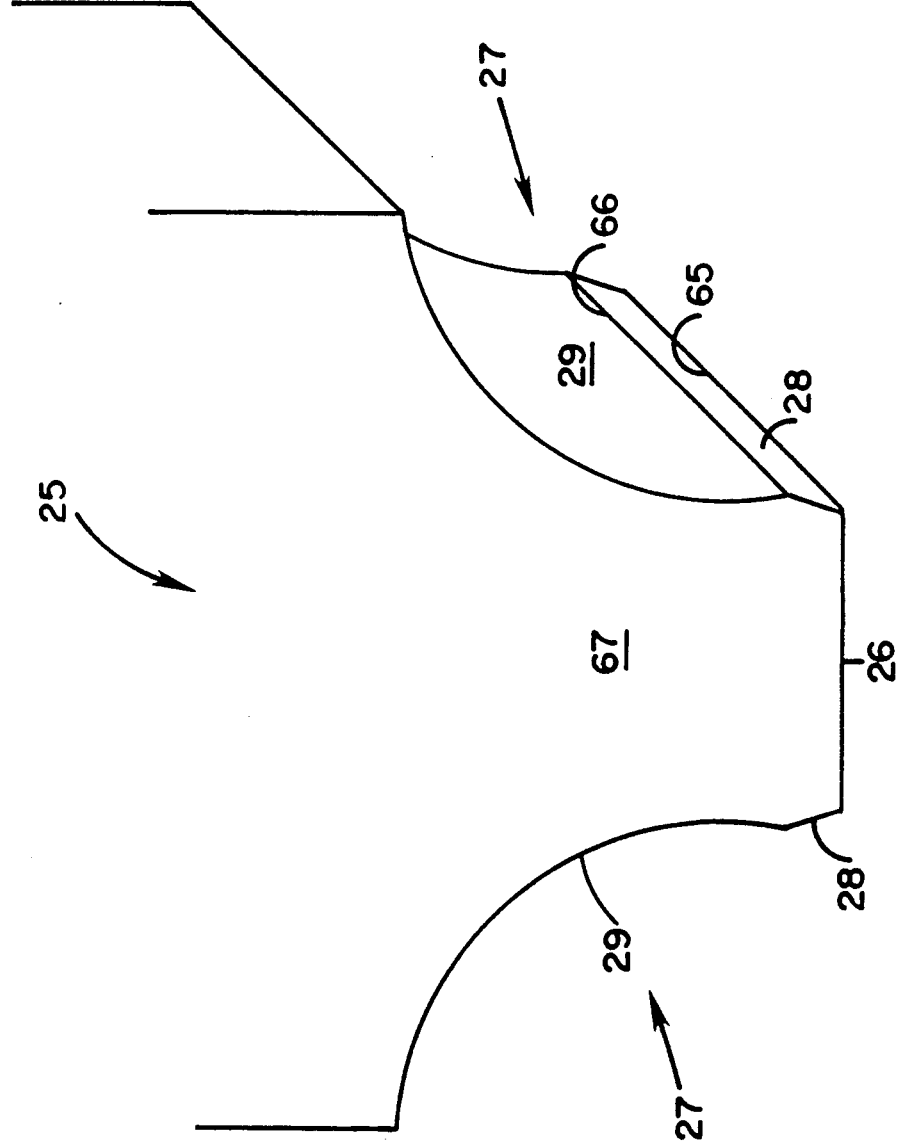
FIG. 5 shows a cutting blade according to the present invention.

A roughing blade, enlarged to more clearly show detail, according to the present invention is illustrated in FIG. 5. The blade 25 comprises front face 67, tip 26 and two sides 27. Each side 27 comprises a first side portion 28 and a second side portion 29. The outermost edge 65 (as viewed radially outwardly from the axis of the cutter) of the first side portion 28 is coextensive along the thickness, extending between the front and back surfaces of the blade 25, with tip 26. The second side portion 29 is, in turn, coextensive along the thickness of the blade 25 with the innermost edge 66 of the first side portion 28. Tip 26 and first side portion 28 form what will be referred to as the "cutting surface" of the roughing blade 25. The cutting edge is formed at the intersection of the front face 67 of the blade with the tip 26 and the first side portion 28. The profile shape of first side portion 28 may be any desired shape, for example a circular arc, and is generally complementary to the respective desired surface of the gear tooth to be cut. Second side portion 29 is relieved away from the first side portion 28 and is therefore spaced or relieved from the surface of the tooth. The amount of relief is of a dimension sufficient to allow coolant to flow therethrough to improve the cooling of the cutting surface and enhance the flow of metal chips away from the cutting blade.

Figure 6:
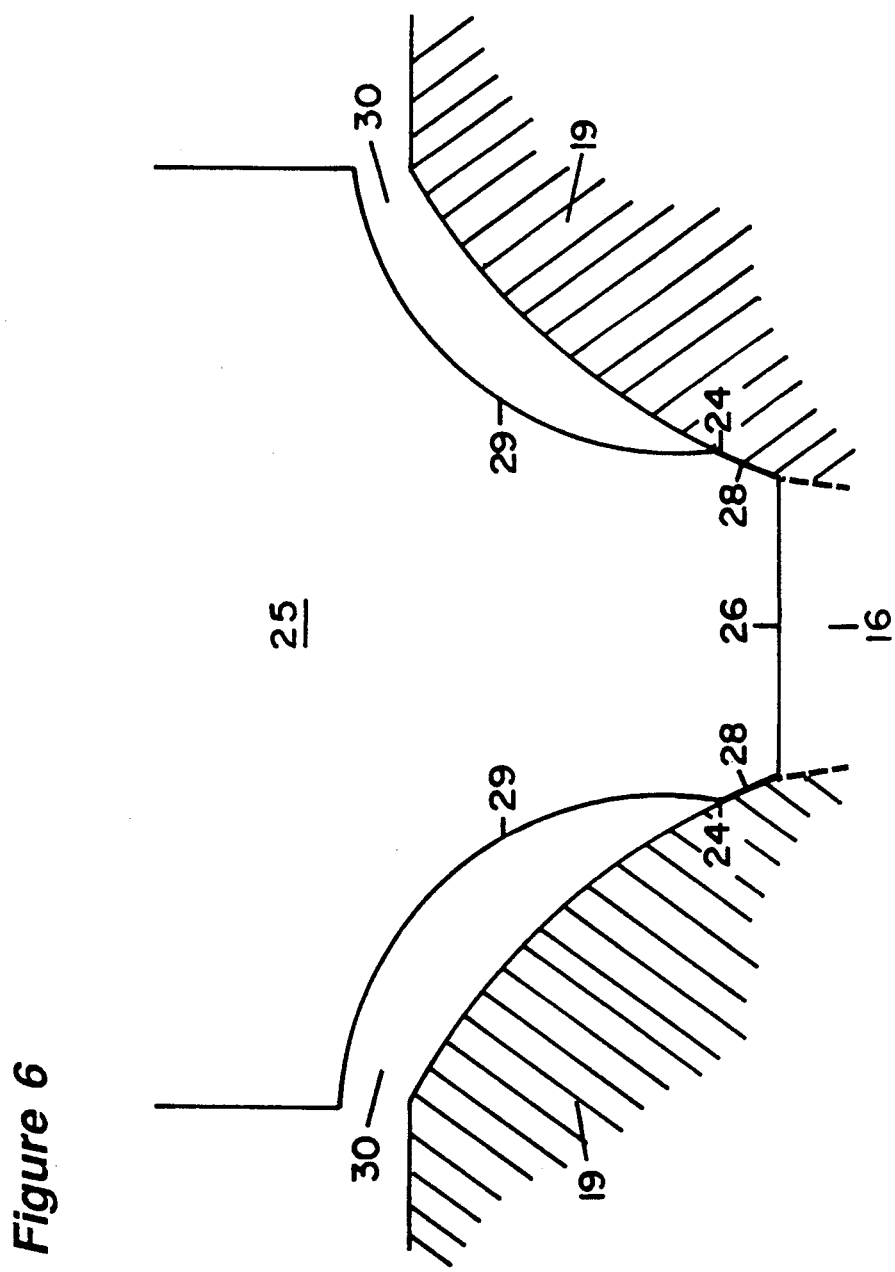
FIG. 6 shows the blade of the present invention in cutting position in a tooth slot.

FIG. 6 shows blade 25 of the present invention (enlarged to show detail) in position for cutting a tooth slot 16 between adjacent teeth 19 of a work gear. It is seen that tip 26 and first side portions 28 cut bottom and side surface portions, respectively, of the teeth of the work gear. These portions 26 and 28 of blade 25 represent the amount of blade 25 that extends beyond the previous roughing blade. The location 24 is the location on the tooth 19 to which the blade preceding blade 25 has previously cut. Just as in FIG. 3, it can be seen that the side surfaces of the teeth 19 extending from location 24 to the top of teeth 19 have been previously formed by preceding roughing blades. Therefore, maintaining the side surface of the blade 25 complementary to the side surface of the work gear beyond location 24 accomplishes no stock removal during cutting since stock material in this area has already been removed by previous blades. Applicants have discovered that by relieving the portion of a cutting blade that extends through the tooth slot space occupied by previous blades, no cutting efficiency is sacrificed. In fact, the cutting efficiency is unexpectedly increased due to the increased amount of coolant that can pass through the space 30 between the relieved surface 29 and the surface of the gear teeth 19. The increased amount of coolant improves cooling and therefore extends the useful life of the cutting surfaces 26 and 28. The increased coolant also enhances the flow of metal chips from the vicinity of the blades thus limiting the occurrences of chips packing between successive cutting blades.

Figure 7:
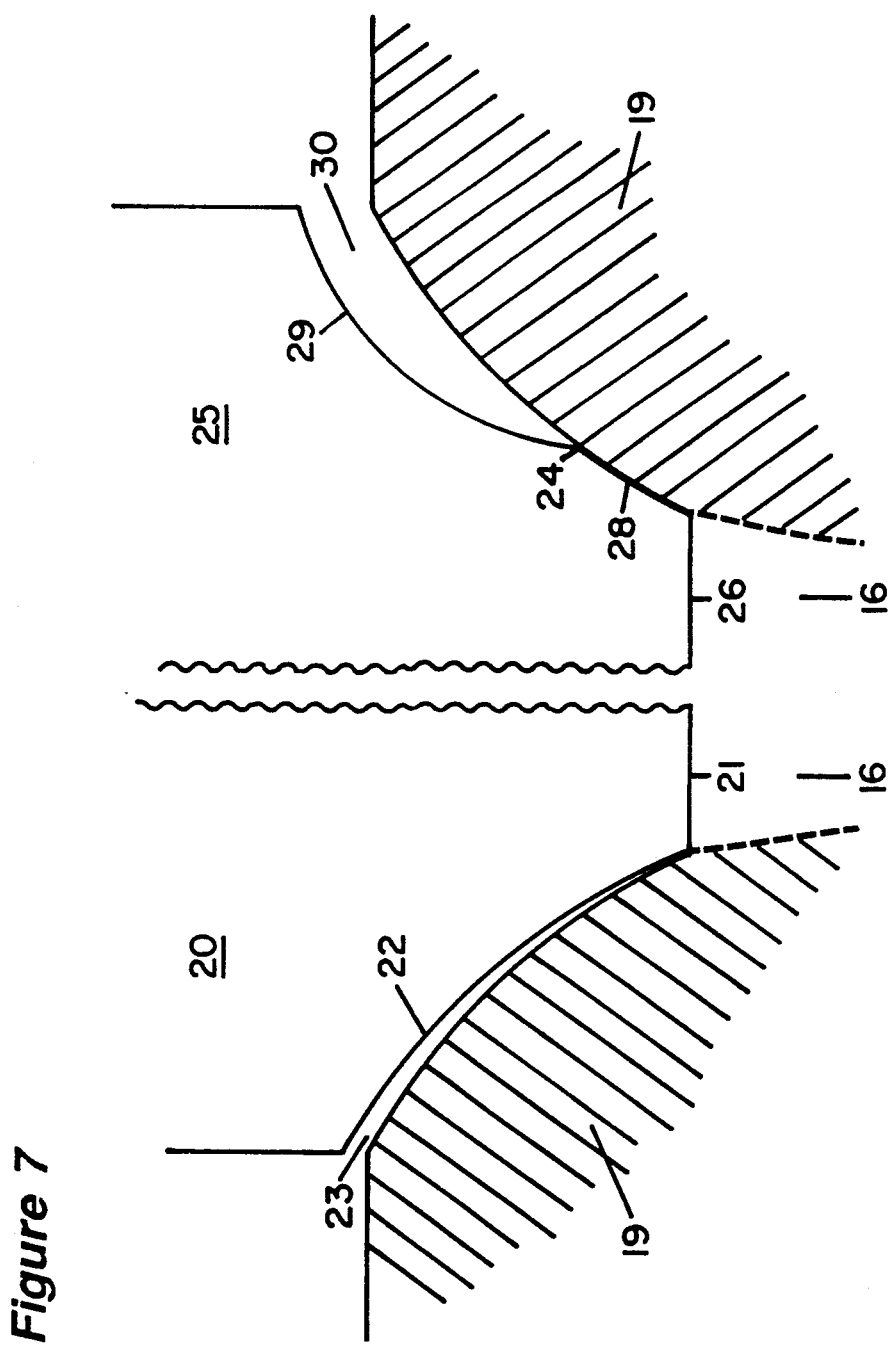
FIG. 7 illustrates a comparison of the blade of the present invention and a blade according to the prior art.

FIG. 7 illustrates, in an enlarged manner, a comparison of a blade 20 according to prior art as illustrated by FIG. 4 and a blade 25 according to the present invention. It can be seen that the clearance 23 of the prior art, intended only to prevent rubbing of the gear side surfaces, is significantly narrower than the clearance 30 of the present invention. The prior art clearance 23 would allow little, if any, coolant to pass therethrough thus preventing cooling of the tip 21. However, the clearance 30 of the present invention is of a dimension to allow the flow of coolant therethrough whereby the cooling of the cutting surfaces 26 and 28 is improved.

For example, the width of the clearance 30 near the top of the tooth 19 may be up to about 0.125 inches or more, the upper limit being dependent, for example, on the amount of blade material required to withstand operational conditions.

Figure 8:
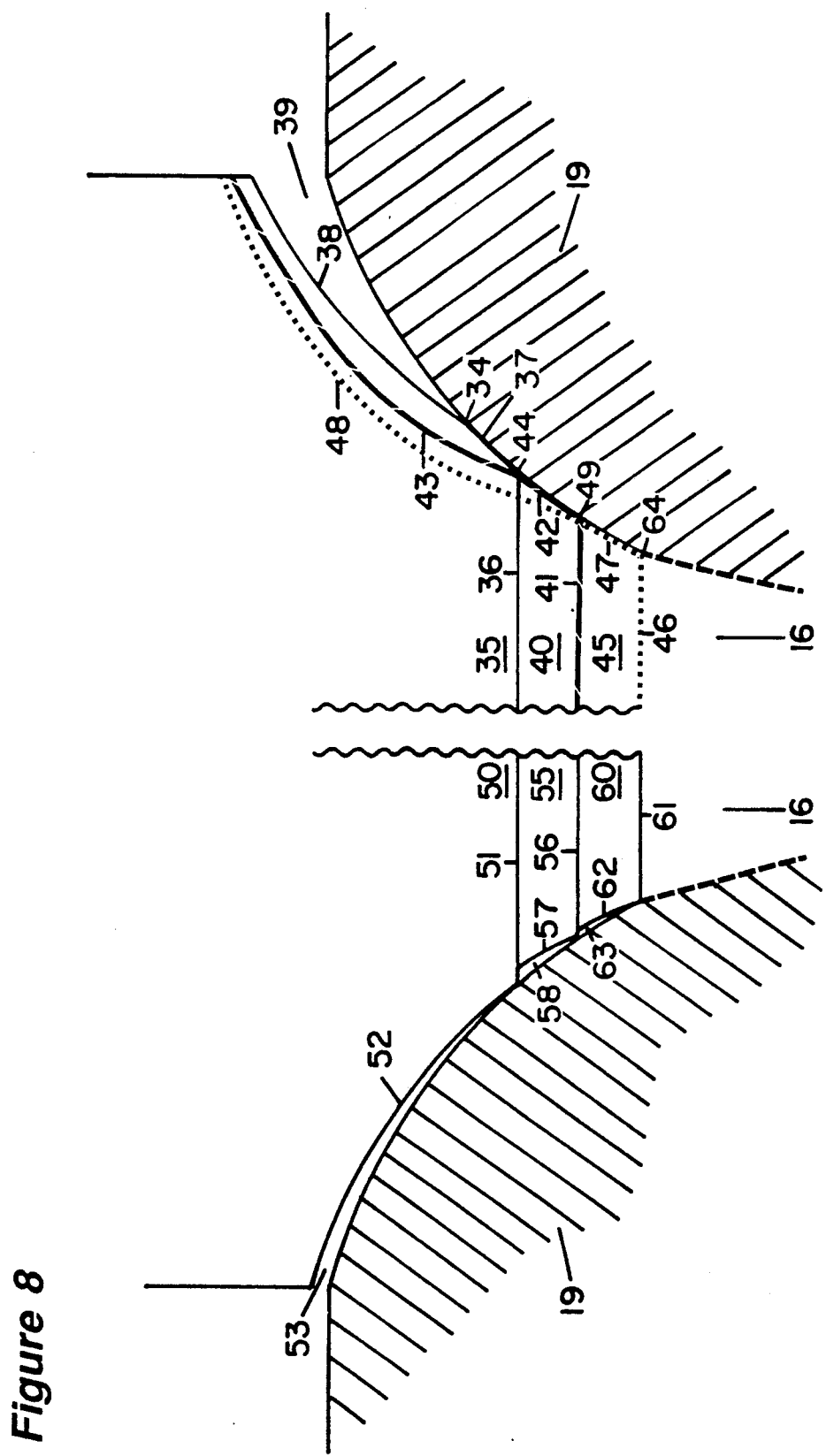
FIG. 8 illustrates a comparison of a series of blades according to the prior art and a series of blades according to the present invention.

FIG. 8 illustrates a comparison, also enlarged, of successive prior art blades 50, 55 and 60 and successive blades 35, 40 and 45 according to the present invention. The prior art blades 50, 55 and 60 comprise respective sides 52, 57 and 62 that are relieved along the entire length thereof. This type of relief causes residual stock material to be left on the tooth sides which in turn increases the amount of material that must be removed by the semi-finishing or finishing blades resulting in excessive wear and shortened life for these blades. The residual stock material is arranged in a stepwise manner as shown by 58 and 63. Decreasing the distance between blades, and thereby increasing the number of blades, does not eliminate the residual stock removal. As a matter of fact, only when the number of blades approaches infinity would the distance between blades approach zero and the amount of residual material also approach zero. Of course, this approach is impractical.

Looking at inventive blades 35, 40 and 45 of FIG. 8, the occurrence of residual stock material is eliminated by the blade form of the present invention. The side surfaces of the blades are comprised of two portions, for example, circular arc profiled, arranged in a piecewise manner. Of the three blades shown, blade 35 would be the first blade to cut in the slot 16. Blade 35 includes tip 36 and first side portion 37 the outermost edge (as viewed radially outwardly from the axis of the cutter) of the first side portion 37 is coextensive along the thickness of the blade with the tip 36. These surfaces, 36 and 37, are precisely ground in order to produce the desired, generally complementary, surface on the gear tooth. Surfaces 36 and 37 also have the appropriate cutting edge formed at their intersection with the front face of the blade. Blade 35 also includes second side portion 38 which is relieved from complementarity with the surface of gear tooth 19. Second side surface 38 is coextensive along the thickness of the blade with the innermost edge of the first side portion 37 and extends from location 34, which is the location to which the blade immediately preceding blade 35 has cut, to approximately the top of the tooth 19 where it intersects the body portion of the blade segment. Second side portion 38 is relieved a significantly greater amount than the clearance 5 of the prior art. The amount of clearance 39 is of a dimension to allow the flow of coolant therethrough to improve the cooling of the cutting surfaces 36 and 37 and also to enhance the flow of metal chips away from the cutting blades.

Immediately following blade 35 is blade 40, illustrated by dashed lines, which comprises tip 41 and first side portion 42. As in all of the roughing blades of the present invention, the tip and the first side portion form the cutting surface of the blades. First side portion 42 extends from its intersection with tip 41 to the location 44 on tooth 19 which represents the location to which the preceding blade 35 has previously cut. The curvature of surface 42 is generally complementary to the desired surface of the tooth 19. Beyond location 44 the desired roughed surface has already been formed by previous blades. Therefore, it is at this point, or slightly beyond in order to create a small overlap, that the relief surface 43 begins. Again it can be seen that the clearance created is much greater than that contemplated by the prior art.

Blade 45, illustrated by dotted lines, immediately follows blade 40. As with the previous blades, a cutting surface is defined by tip 46 and first side portion 47. First side portion 47 extends from the tip 46 to location 49 which is the location to which preceding blade 40 has already cut. Located beyond location 49 is second side portion 48 which is relieved from the tooth surface 19. Location 64 is the location to which blade 45 cuts and is the location to which the first side portion of the next blade would extend.

By including the first side portions 37, 42 and 47 on successive blades 35, 40 and 45 respectively, residual stock material on the roughed tooth surfaces is eliminated and a desired profiled surface, for example a substantially circular arcuate profile, is formed on the teeth 19. There is no stepwise arrangement of stock material on the tooth surfaces, such as shown at 58 and 63 of the prior art, after rough cutting with the rotary cutter of the present invention. Moreover, with the present invention, cooling of the cutting surfaces is enhanced as is the flow of metal chips from the vicinity of the blades. An additional advantage is that since the relieved surfaces do no cutting, the surfaces do not require precision grinding nor is the formation of a cutting edge necessary at the intersection of the relieved surfaces with the front face of the blade. This advantage amounts to a considerable cost savings due to the reduced grinding time that is required.

Relief surfaces may be of any form which permits the flow of coolant therethrough such as a circular arc. In FIG. 8, relief surfaces 38, 43 and 48 are circular arcs of substantially the same curvature but having centers spaced along a line extending radially of the cutter axis and containing the center of curvature of the first side portions 37, 42 and 47.

The rotary cutters of the present invention may comprise only roughing blades or, preferably, may have a plurality of blades located about the periphery thereof comprising roughing blades, semi-finishing blades and/or finishing blades. With the latter type of cutter, a gear tooth slot will be completely finished with one rotation of the cutter.

Figure 9:
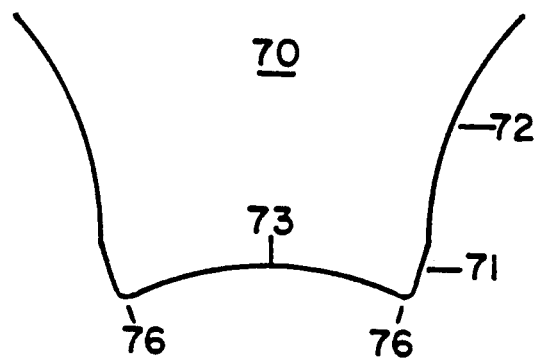
FIGS. 9a, 9b and 9c illustrate alternative blade tip forms according to an additional aspect of the present invention.
Figure 9:
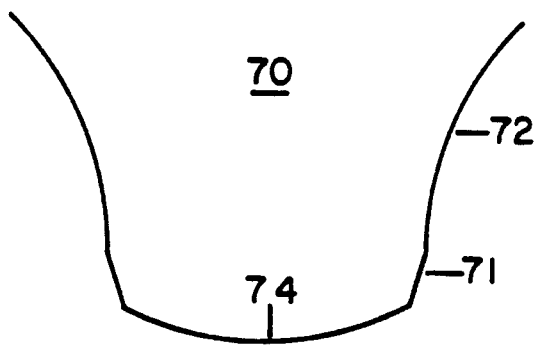
Figure 9:
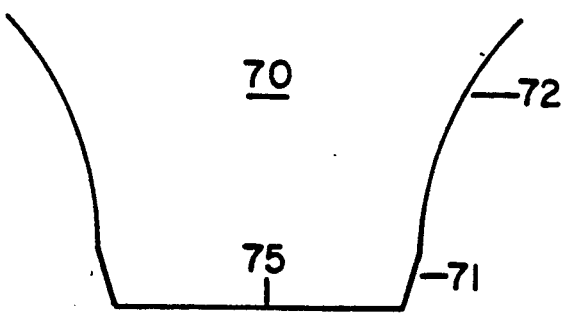

FIGS. 9a, 9b and 9c illustrate alternative blade tip configurations of the present invention. The Figures have been enlarged and exaggerated to show detail. FIG. 9a shows a blade 70 comprising first side portion 71 and second side portion 72 and a substantially concave-shaped tip or end 73. The concave-shaped tip 73 may be formed by conventional grinding processes having fixed abrasive wheels whose circular grinding surface imparts a concave shape to the blade tip.

However, with the advent of computer numerical control (CNC) grinding machines, any desired shape may be obtained on the blade tip. FIG. 9b shows a blade similar to FIG. 9a except that the blade tip configuration 74 is substantially convex-shaped. The convex-shaped blade tip 74 enhances the ability of metal chips to roll from a workpiece, that is, the metal removed by such a blade tends to roll into a tightly curved generally spiral-shaped configuration which significantly reduces chip packing in the spaces between blades. Metal chips removed in such a manner reduce the stress on a cutting blade thus extending the useful life thereof. The convex-shaped blade tip 74 also results in improved cutter action since the tip does not impact across its entire width instantaneously. Instead, impact takes place outwardly from the center of the tip thus increasing the impact time and resulting in smoother cutting.

FIG. 9c illustrates another similar blade 70 having sides 71 and 72 wherein the tip configuration 75 is substantially a planar surface. As with convex-shaped blade tips 74, points of inflection 76, normally found in concave-shaped blade tips 73, are eliminated with the result being a stronger cutting blade. A single rotary cutter may comprise more than one blade tip configuration. For example, all three of the abovediscussed blade tip configurations may be present on a single rotary disc cutter according to the present invention.

Figure 10:
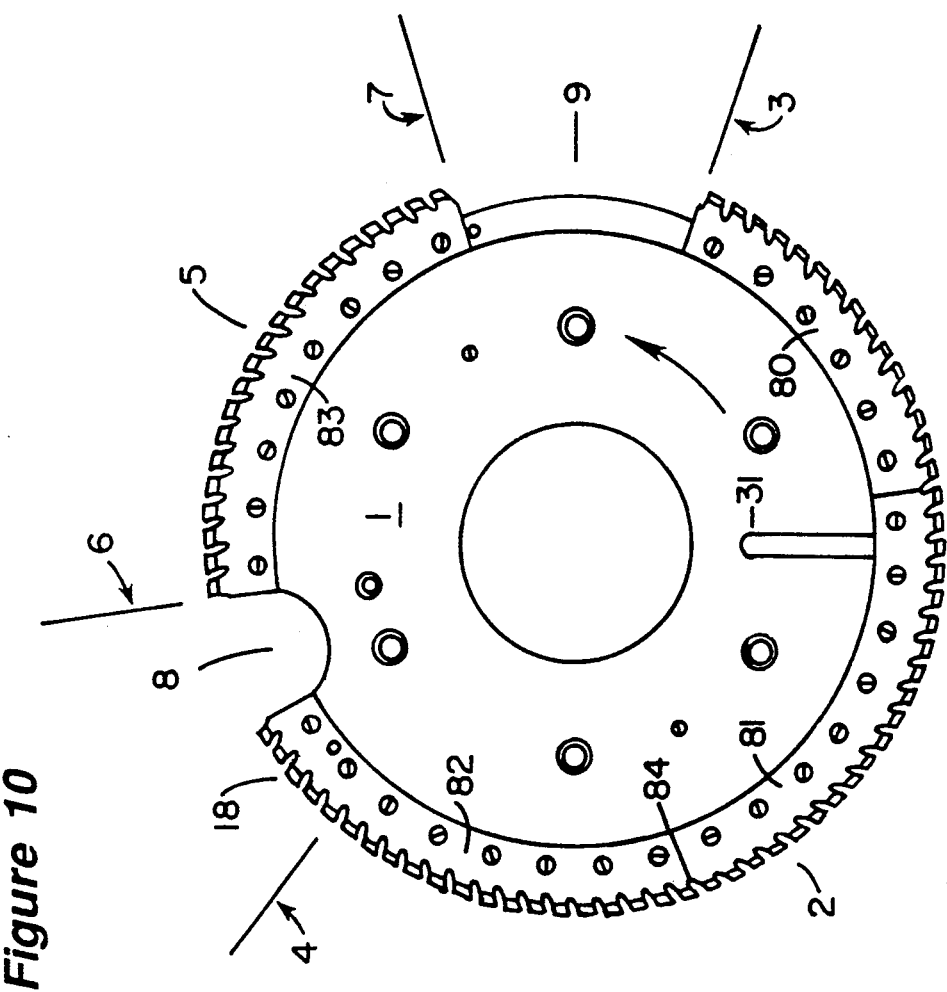
FIG. 10 illustrates a configuration of a rotary disc cutter in accordance with an another additional aspect of the present invention.

FIG. 10 illustrates an alternative rotary cutter according to another aspect of the present invention. In this embodiment, the many segments 17 shown in FIG. 1 have been replaced by substantially larger segments 80, 81, 82 and 83. By replacing the plurality of smaller segments 17 by significantly fewer larger segments, many of the seams between the segments, illustrated by 84, for example, are eliminated thus increasing the rigidity of the rotary cutter. Any movement of the blades is greatly restricted by eliminating many of the areas where movement may occur. The larger segments also permit quicker assembly of the rotary cutter since the number of time consuming checks for proper seating of the segments 80, 81, 82 and 83 on the cutter body 1 are reduced due to the lesser number of blade segments.

Figure 11:
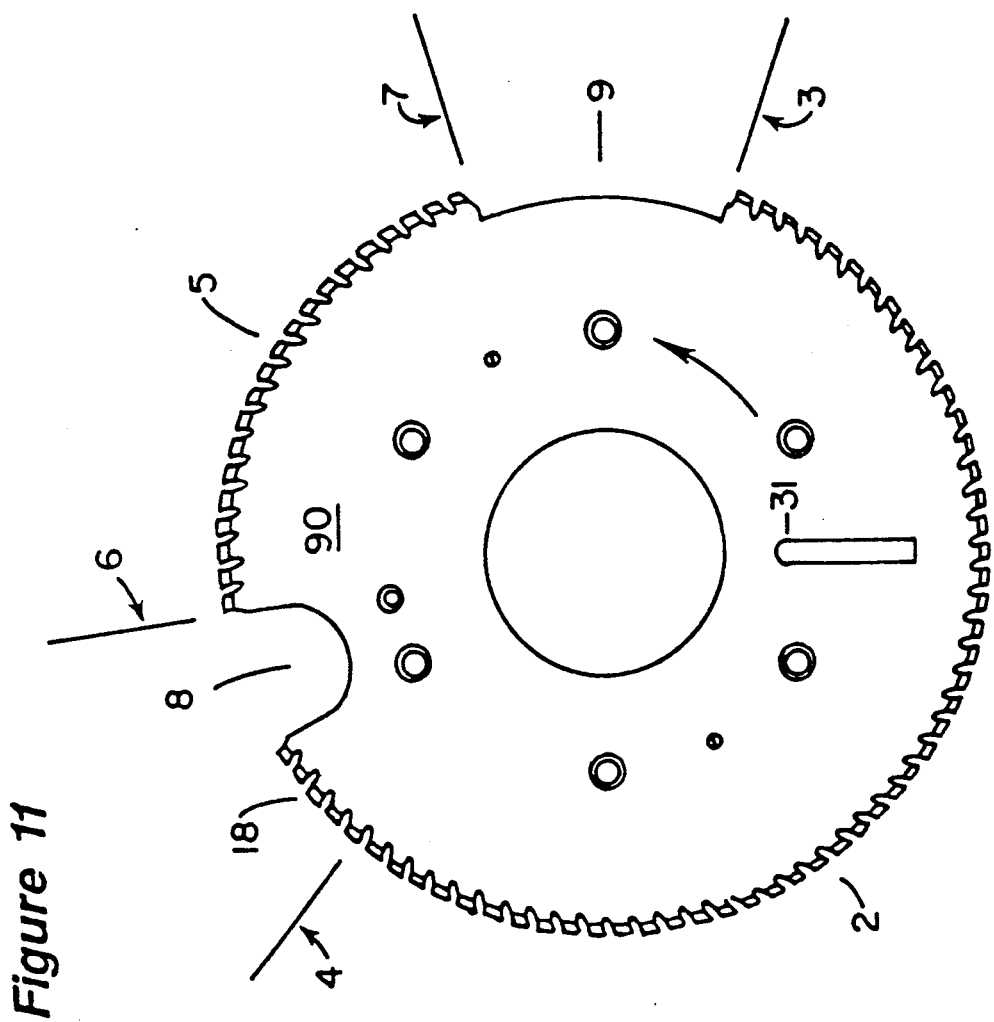
FIG. 11 illustrates a rotary disc cutter according to the present invention wherein the rotary disc cutter is formed from a solid metal disc.

Segments 80, 81 and 82 comprise roughing blades 2, in accordance with the present invention, arranged about the periphery of the rotary cutter in a clockwise direction extending from 3 to 4. The last several blades, for example generally five, of segment 82 may be semi-finishing blades. Following the deburring gap 8, all of the finishing blades 5, extending from 6 to 7, may be located on one segment 83. Generally, no more than about five segments are desired for the roughing and/or semi-finishing blades with no more than three segments being preferred and no more than about two segments are desired for the finishing blades with one segment being preferred. However, the rotary disc cutter comprising the roughing blades of the present invention may also be formed from a solid metal disc, such as a casting of cutting tool steel, whereby the need for segments, comprising blades and attached to the cutter body, would be nonexistent. A rotary disc cutter 90 formed from a solid metal disc is illustrated in FIG. 11.

The rotary cutter of the present invention may be formed by first providing at least one circular arc segment, either small, 17, or large, 80, 81, 82 and 83, for example, in substantially the desired or "roughed" form. This includes providing the blade forms, spaces or gashes between successive blades and mounting surfaces on the segments for attachment to the cutter body 1. This step is generally carried out on a grinding machine, preferably a CNC grinding machine. A roughing blade form comprising a tip and two sides each having first and second side portions according to the present invention is first formed on the blade segment blank. The formed segment is then gashed to form the individual blades of the segment. Smaller segments 17 may have about five blades per segment while larger segments such as 80 may have about fifteen or more blades per segment. Gashing forms the spaces between successive blades, thus it can be seen that the front face of one blade and the back surface of an adjacent blade are simultaneously formed by gashing. Also, the mounting surfaces are formed on the segment. The mounting surfaces are the surfaces which contact the cutter body when the rotary disc cutter is assembled. The segment may then be hardened by heat treating.

The mounting surfaces of the segment may be finished to their desired dimensions, preferably by grinding. After the mounting surfaces are formed, the roughed segments are then mounted on a grinding head, which is shaped substantially the same as the cutter body 1, and the blades surfaces are finish ground to their final form. However, with the roughing blades of the present invention, only the tip and the first side portion require finish grinding to form a finished surface. Since the relieved second side portion does not contact the workpiece it does not require a finished surface to be formed thereon. Therefore, the surface formed by the initial rough-forming operation is sufficient for the second side portion. It can be seen that the reduced amount of finish grinding offers a significant cost and time savings when producing the rotary disc cutters of the present invention. Finally, the front face of the blades are finished, preferably by grinding, in order to form a cutting edge at the intersection of the front face with the tip and the first side portion. Of course, the semi-finishing and finishing blades are formed according to the particular application of the rotary cutter. These blades have cutting surfaces along their entire tip and sides with the curvature of the side being dependent upon the type of gear to be cut or the specific tooth profile desired as was previously discussed in the "Background of the Invention".

If a solid disc is utilized there will be no segments that require forming and therefore the blades may be rough formed, gashed and finished on the solid disc.

The present invention offers increased efficiency combined with decreased production costs for rotary disc cutters. The blade side configuration comprising two side portions enables the required stock material to be removed from the surface of a gear tooth while providing for increased amounts of coolant to reach the cutting surfaces of the blade and wash chips away from the vicinity of the blades. Finish grinding is needed only on one side portion thus representing a cost and time savings since there is no need to finish grind the entire surface of the sides of the blades.

While the present invention has been described with reference to preferred embodiments it is to be understood that the invention is not limited to the particulars thereof. The present invention is intended to include modifications which would be apparent to those skilled in the art to which the subject matter pertains without deviating from the scope and spirit of the appended claims.

What is claimed is:

1. A rotary disc cutter for cutting workpieces, said cutter comprising:
  a rotary disc cutter body,
  a plurality of cutting blades located about the periphery of said rotary disc cutter body,
  at least a portion of said plurality of cutting blades each having a thickness extending between a front surface and a back surface, a tip and two sides wherein each of said sides comprises first and second side portions,
  said first side portion having an outermost edge coextensive along the thickness of said blades with said tip and along with said tip defining a cutting surface for cutting said workpieces,
  said second side portion being coextensive along the thickness of said blades with an innermost edge of said first side portion, said second side portion having a surface relieved from said first side portion.

2. The rotary disc cutter of claim 1 further comprising said first side portion having a circular arc profile.

3. The rotary disc cutter of claim 1 further comprising said second side portion having a circular arc profile.

4. The rotary disc cutter of claim 1 further comprising said first and second side portions having circular arc profiles.

5. The rotary disc cutter of claim 1 wherein said portion of said plurality of cutting blades comprises roughing blades.

6. The rotary disc cutter of claim 5 wherein each said roughing blade is of a length greater than the length of the immediately preceding roughing blade.

7. The rotary disc cutter of claim 5 wherein in addition to said roughing blades, said plurality further includes at least one of semi-finishing blades and finishing blades.

8. The rotary disc cutter of claim 7 wherein each of said roughing blades, said semi-finishing blades and said finishing blades includes a tip with each said tip having a configuration selected from the group consisting of substantially convex, substantially concave and substantially planar.

9. The rotary disc cutter of claim 7 further comprising said plurality of blades being formed integral with a plurality of blade segments for attachment to said rotary disc cutter body, said roughing blades and said semi-finishing blades being formed integral with no more than about five blade segments and said finishing blades being formed integral with no more than about two blade segments.

10. The rotary disc cutter of claim 9 further comprising said roughing blades and said semi-finishing blades being formed integral with no more than three blade segments.

11. The rotary disc cutter of claim 9 further comprising said finishing blades being formed integral with no more than one blade segment.

12. The rotary disc cutter of claim 1 wherein said cutter is formed from a solid metal disc.

13. A rotary disc cutter for cutting gears, said cutter comprising:
  a rotary disc cutter body,
  a plurality of cutting blades located about the periphery of said rotary disc cutter body,
  at least a portion of said plurality of cutting blades each having a thickness extending between a front surface and a back surface, a tip and two sides wherein each of said sides comprises first and second side portions,
  said first side portion having an outermost edge coextensive along the thickness of said blades with said tip and along with said tip defining a cutting surface for cutting said gears,
  said second side portion being coextensive along the thickness of said blades with an innermost edge of said first side portion, said second side portion having a surface relieved from said first side portion whereby, during cutting, a clearance exists between the relieved surface of said second side portion and the gear surface, said clearance being of a dimension to allow the passage of coolant therethrough thereby improving the cooling of said cutting surface.

14. The rotary disc cutter of claim 13 further comprising said first side portion having a circular arc profile.

15. The rotary disc cutter of claim 13 further comprising said second side portion having a circular arc profile.

16. The rotary disc cutter of claim 13 further comprising said first and second portions having circular arc profiles.

17. The rotary disc cutter of claim 13 wherein said portion of said plurality of cutting blades comprises roughing blades.

18. The rotary disc cutter of claim 17 wherein each said roughing blade is of a length greater than the length of the immediately preceding roughing blade.

19. The rotary disc cutter of claim 17 wherein, in addition to said roughing blades, said plurality further includes semi-finishing blades and finishing blades.

20. The rotary disc cutter of claim 19 wherein each of said roughing blades, said semi-finishing blades and said finishing blades includes a tip with each said tip having a configuration selected from the group consisting of substantially convex, substantially concave and substantially planar.

21. The rotary disc cutter of claim 19 further comprising said plurality of blades being formed integral with a plurality of blade segments for attachment to said rotary disc cutter body, said roughing blades and said semi-finishing blades being formed integral with no more than about five blade segments and said finishing blades being formed integral with no more than about two blade segments.

22. The rotary disc cutter of claim 21 further comprising said roughing blades and said semi-finishing blades being formed integral with no more than three blade segments.

23. The rotary disc cutter of claim 21 further comprising said finishing blades being integral with no more than one blade segment.

24. The rotary disc cutter of claim 13 wherein said cutter is formed from a solid metal disc.

25. In a rotary disc cutter for cutting gears, said cutter comprising,
  a rotary disc cutter body,
  a plurality of blades spaced about the periphery of said cutter body,
  a first portion of said plurality of blades comprising roughing blades,
  a second portion of said plurality of blades comprising finishing blades,
  each of said roughing blades and said finishing blades comprising a thickness extending between a front surface and a back surface, a tip and two sides, the improvement comprising,
  each of said two sides of said roughing blades comprising a first side portion and a second side portion, said first portion having an outermost edge coextensive along the thickness of said blades with said tip, said tip and said first side portion defining a cutting surface of said blade, said second side surface being coextensive along the thickness of said blades with an innermost edge of said first side surface and being relieved from said first side surface whereby during cutting a clearance exists between said second side surface and the tooth surface of a gear, said clearance being of a dimension to allow the flow of coolant therethrough and improve the cooling of said cutting surface.

26. The rotary disc cutter of claim 25 further comprising the profile of at least one of said first side portion and said second side portion being a circular arc.

27. The rotary disc cutter of claim 25 wherein said tip of each of said roughing blades and said finishing blades comprises a configuration selected from the group consisting of substantially convex, substantially concave and substantially planar.

28. The rotary disc cutter of claim 25 further said roughing blades and said finishing blades being formed integral with a plurality of blade segments for attachment to said rotary disc cutter body, said roughing blades being formed integral with no more than about five blade segments and said finishing blades being formed integral with no more than about two blade segments.

29. A method of producing roughing blades for a rotary disc cutter for cutting gears, said method comprising:
providing at least one blade segment,
rough forming a blade form on said segment, said blade form comprising a tip and two sides wherein said sides each comprise first and second side portions with said first side portion having an outermost edge coextensive along the thickness of said blade form with said tip and said second side portion being coextensive along the thickness of said blade form with an innermost edge of said first side portion, said second side portion being relieved from said first side portion whereby, during said cutting, a clearance exists between the relieved surface of said second side portion and the surface of the gear being cut,
gashing the rough formed blade segment to thereby form a plurality of blades on said segment, said gashing forming spaces between successive blades on said segment thus producing front and rear surfaces on said rough formed blades,
forming a finished surface on said tip and said first side portion thereby forming a cutting surface thereon,
forming a finished surface on said front surface of said blades thereby forming a cutting edge at the intersection of said front surface with said tip and said first side portion.

30. The method of claim 29 wherein said rough forming comprises rough grinding.

31. The method of claim 29 wherein said forming a finished surface on said tip surface and said first side portion comprises finish grinding.

32. The method of claim 29 wherein said forming a finished surface on said front surface comprises finish grinding.

33. The method of claim 29 wherein said rough forming said first side surface portion comprises providing said first side portion with a circular arc profile.

34. The method of claim 29 wherein said rough forming said second side surface portion comprises providing said second side portion with a circular arc profile.

35. The method of claim 29 wherein said rough forming said first side surface portion and said second side surface portion comprises providing said first side portion and said second side portion with a circular arc profile.

* * * * *